United States Patent
Smith

(12)
(10) Patent No.: US 6,167,896 B1
(45) Date of Patent: Jan. 2, 2001

(54) SHELTERS

(76) Inventor: Henry Roy Smith, Thorney, Darbys Green, Knightwick, Worcester (GB)

(*) Notice: Under 35 U.S.C. 154(b), the term of this patent shall be extended for 0 days.

(21) Appl. No.: 09/133,079

(22) Filed: Aug. 12, 1998

(30) Foreign Application Priority Data

Dec. 18, 1997 (GB) .................................................. 9726611

(51) Int. Cl.⁷ ...................................................... A45F 1/04
(52) U.S. Cl. .............................. 135/96; 135/99; 135/119; 135/900; 174/2; 174/3
(58) Field of Search .................................. 135/96, 98, 99, 135/124, 137, 147, 158, 159, 900, 902, 119; 174/2, 3, 4 R, 6, 7

(56) References Cited

U.S. PATENT DOCUMENTS

| | | | |
|---|---|---|---|
| 407,660 | * | 7/1889 | Hill .......................................... 174/2 |
| 881,453 | * | 3/1908 | Anderson ................................. 174/2 |
| 1,155,648 | * | 10/1915 | Dodd ........................................ 174/2 |
| 1,175,749 | * | 3/1916 | Gunthorpe ............................... 174/2 |
| 2,518,167 | * | 8/1950 | Mintz ................................ 135/119 X |
| 3,477,453 | * | 11/1969 | D'Ulisse et al. .................... 135/16 X |
| 3,860,022 | * | 1/1975 | Arndt et al. ............................ 135/98 |
| 3,889,698 | * | 6/1975 | Roessl ................................ 135/98 X |
| 4,447,847 | | 5/1984 | Drulard . |
| 4,488,392 | | 12/1984 | Pearcey et al. . |
| 5,043,527 | | 8/1991 | Carpenter, Jr. . |
| 5,798,482 | * | 8/1998 | Reeves ..................................... 174/2 |

FOREIGN PATENT DOCUMENTS

857311 * 12/1960 (GB) .................... 135/33.6

WO 94/02980 2/1994 (WO) .
WO 94/26990 11/1994 (WO) .

* cited by examiner

*Primary Examiner*—Richard Chilcot
(74) *Attorney, Agent, or Firm*—Townsend and Townsend and Crew LLP

(57) ABSTRACT

A lightning shelter for people is formed from a plurality of elongate electrically conductive members first ends of which are held conjoined between a pair of metal plates. Each member extends away from and depends from its first end to define a frame and the second end of each member has an electrically conductive spike drivable into the ground on which the shelter stands. The outer surface of each elongate member is electrically insulated e.g. with a layer of polyethylene. A further electrically conductive member is removably mountable on the frame on the plates to extend normally away from said frame. In moving from its first to its second end each elongate member extend firstly through a curved portion (quarter circle) and then through a generally straight portion. The second ends of the elongate members define points on the perimeter of a circle and have attached thereto and electrically connected therewith another electrically conductive member extending generally radially outwardly of the circle and terminating in a further electrically conductive spike drivable into the ground. The shelter is provided with an electrically conductive metal mesh floor electrically coupled to the elongate members and the first said spike. The shelter has a cover of a waterproof fabric material placable over at least part of said frame and held thereon by a rope passing through loops or eyelets on the edges of the cover and apertures in the elongate members.

18 Claims, 6 Drawing Sheets

SHELTERS

BACKGROUND OF THE INVENTION

The invention relates to shelters, in particular shelters for individuals groups or people caught in the open in inclement weather—particularly when there is a danger of lightning.

Many people follow avocations e.g. golfers, and walkers, which mean that they can be caught in the open at times of inclement weather. This can be particularly dangerous should there be lightning as it is possible the individual might be struck by lightning and severely injured or even killed.

Sheltering at such times under trees can be highly dangerous as a lightning strike may be attracted to a tree under which one is sheltering and thus provide an effective conduit for the lightning strike to a person sheltering beneath the tree.

SUMMARY OF THE INVENTION

Embodiments of the invention aim to provide an arrangement of shelter which is readily mountable at a position in which it may be entered by an individual caught in inclement weather, particularly thunder storms.

In a first aspect the present invention provides a shelter comprising a plurality of elongate electrically conductive members first ends of which are conjoined, each said elongate electrically conductive member extending away from and depending from its first end to define a fraxme, the second end of each elongate electrically conductive member being provided with a first electrically conductive spike member drivable into the ground.

The shelter may comprise a further electrically conductive member removably mountable at the point of conjunction of said plurality of electrically conductive elongate members to extend normally away from said frame.

Each said elongate electrically conductive member in moving from its said first to its said second ends extends firstly through a curved portion and then through a generally straight portion. Said curved portion is substantially one quarter of a circle.

The second ends of the plurality of elongate electrically conductive members preferably define points on the perimeter of a circle.

Each of the plurality of elongate electrically conductive members has attached thereto adjacent its said second end and electrically connected therewith another electrically conductive member extending generally radially outwardly of the circle.

Each of said other outwardly extending conductive members preferably has at its free end a further electrically conductive spike member drivable into the ground.

The outer surface of each elongate electrically conductive member may be covered with an electrically insulating layer. The insulating layer may comprise polyethylene.

The shelter may be provided with a floor of electrically conductive material, e.g. of welded metal mesh.

Desirably, the floor is electrically coupled to each of the plurality of elongate electrically conductive members and said first spike members.

The floor may extend outwardly of the second ends of the plurality of elongate electrically conductive members.

The floor may be welded to collars adapted to surround the elongate electrically conductive members and which are fixed thereto by a plurality of electrically conductive bolts.

With advantage the outer perimeter of said floor is within the perimeter of the circle defined by said further spike members.

The floor and the further spike members are, in use, preferably located beneath the surface of ground upon which the shelter stands.

The first ends of the plurality of elongate electrically conductive members are preferably joined by a pair of plate members bolted to either side of said first ends.

The heads of the bolts which hold the plate members together, within the frame, are desirably domed.

The shelter may further comprise a cover of a waterproof fabric material placable over at least part of said frame.

Said cover may be held in position by a rope passing through loops carried on the edges of the cover and through apertures in said elongate electrically conductive members.

Preferably, the cover is held on the frame by a rope passing through apertures formed in the elongate electrically conductive members and eyelets formed in the edge of the cover.

The above aspects, features and advantages of the invention will become more apparent from the following description of an embodiment thereof now made with reference to the accompanying drawings in which:

DESCRIPTION OF THE SPECIFIC EMBODIMENT

Figure 5:
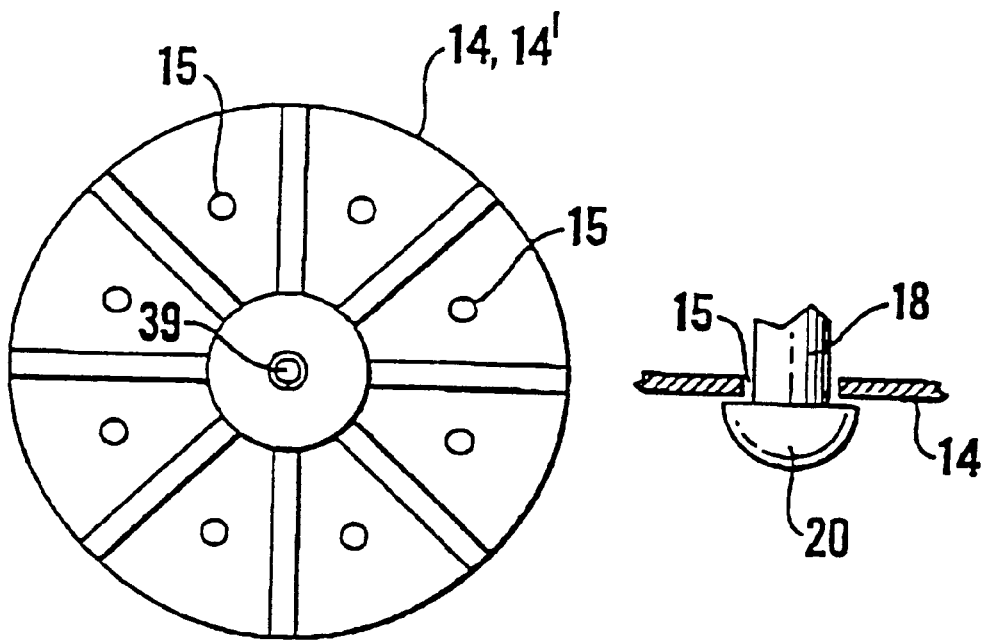
Figure 5:
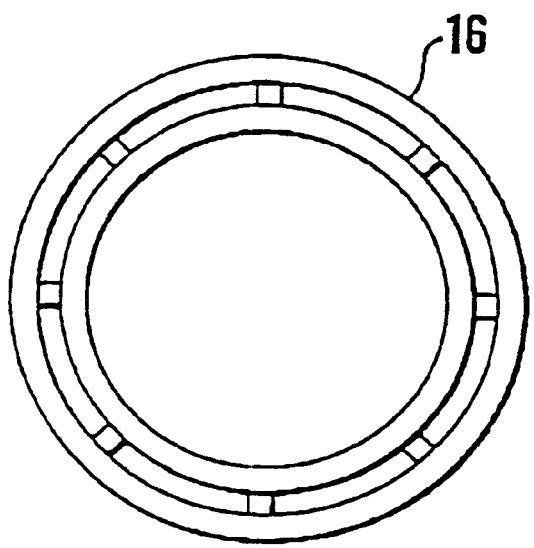

With reference now to the drawings which show a shelter embodying the invention to comprise a plurality, eight, hollow metal members 10 the first ends 12 of which are held joined together by plates 14, 14' (see detail FIG. 5) passing to either side of the ends 12. An extruded polyethylene insulation sleeve 16 is provided between the plates securing the ends 12 of the members 10.

The plates 14, 14' include a number of apertures 15. The plates are held together by bolts 18 passing through the apertures 15 and having domed heads 20 on the lowermost (as viewed) side of the plates.

In moving from the plates 14, 14' the members 10 first extend through an actuate portion 22 substantially one quarter of a circle with a 3 m (10') radius and then through second substantially straight portions 24 approximately 2 m (7') in length.

Figure 2:
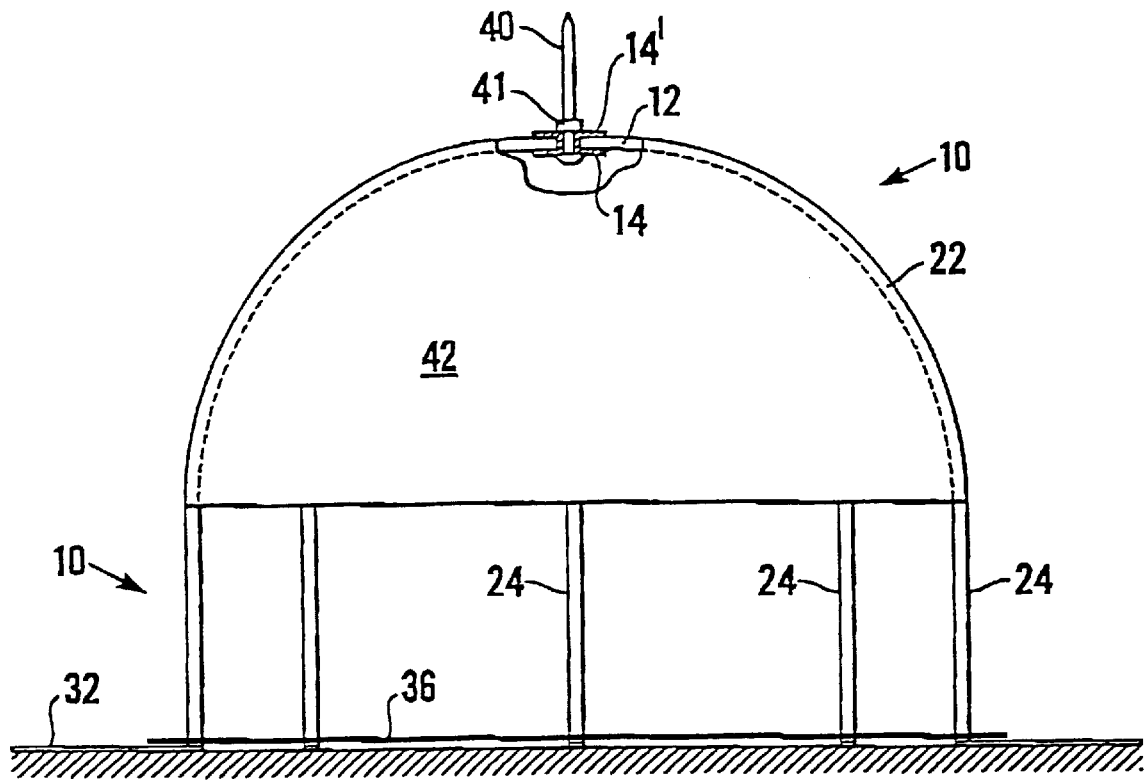
FIG. 2 is a side view of the shelter shown in FIG. 1.
Figure 3:
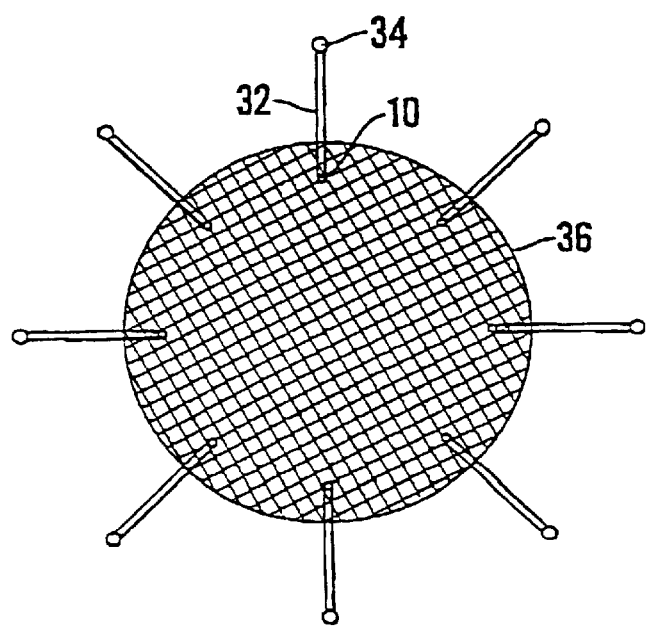
FIG. 3 is a plan view to a reduced scale drawn of FIG. 2.

It will be seen (FIG. 2) that the portions 24 depend substantially vertically in use The outer surface of each elongate electrically conductive member is covered with an electrically insulating layer (not shown), for example a layer of polyethylene approximately 3 mm (0.125)' thick.

Figure 4:
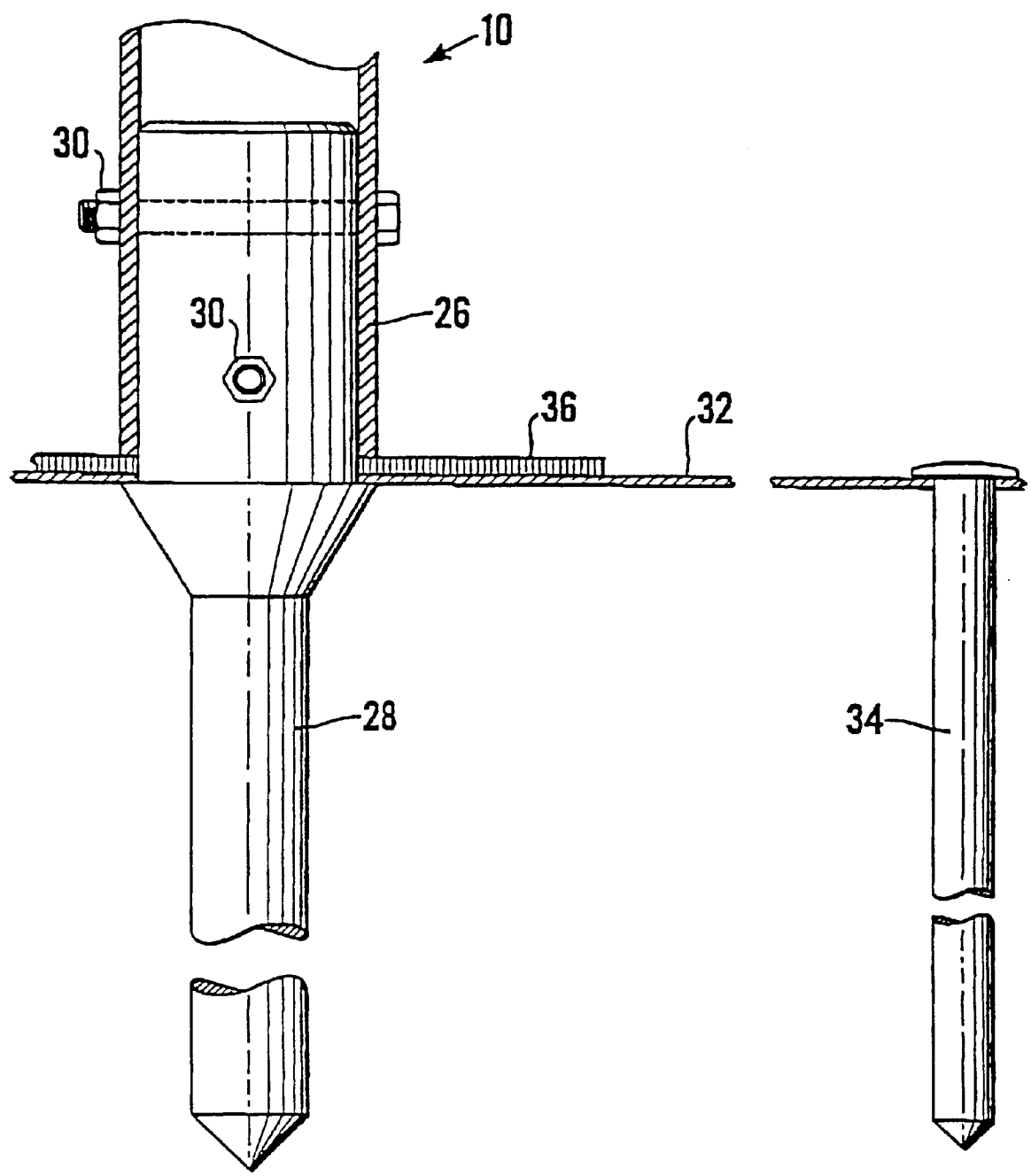
FIGS. 4, 5, 6 and 7 are views showing details of the shelter shown in FIGS. 1 to 3.

The second ends 26 of the members 10 receive earthing or grounding spikes 28 (see detail FIG. 4) held in position by bolts 30 passing through apertures in the ends 26 and the spikes 28. The spikes 28 are of solid metal.

The ends 26 of members 10 define points on the circumference of a circle.

Each end 26 of a member 10 has welded to it a ground extension bar 32 extending generally radially outwardly of the circle defined by the ends 26 of members 10. The bars 32 are approximately 2.75 m (9') long. The ground extension bars 32 have on their outermost ends further solid metal earthing or grounding spikes 34.

It will be appreciated that the frame forming shelter may be positioned with the grounding spikes 28, 32 driven into soil to electrically earth or ground the shelter.

Figure 7:
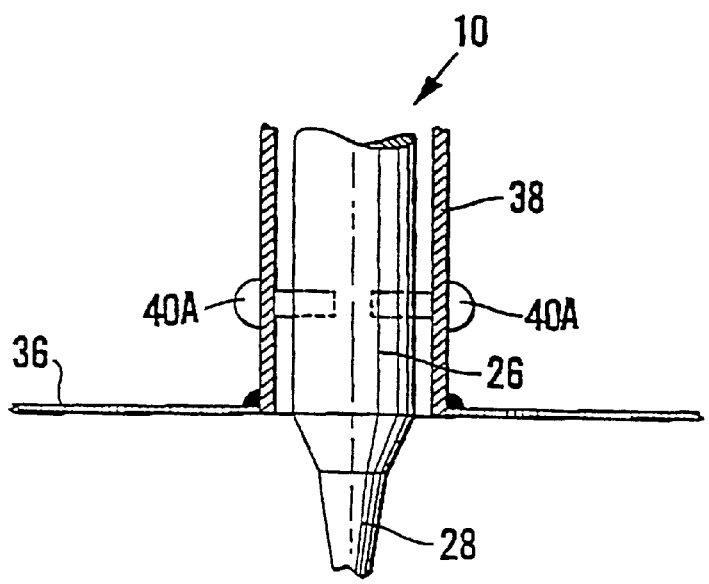

The shelter is further provided with a metal mesh floor 36 which is welded to collars 38 (see detail FIG. 7) surrounding the lower ends 26 of the elongate metal members 10. Each collar 38 is fixed to its associated elongate metal member 10 three bolts 40A.

In the alternative the metal mesh floor 36 may be welded to both the ends 26 of members 10 and the spikes 28.

The metal mesh floor 36 extends outwardly of the ends 26 of members 10 by approximately 0.75 m (2').

The central parts of the plates 14, 14' (see detail FIG. 5) are centrally apertured at 39 to receive a metal spike member 40. Member 40 is positioned by being passed upwardly (as viewed FIG. 2) through the aperture 39 and then held in position by a nut 41 engaging a threaded portion of member 40 above the plates 14, 14'. The tip of spike member 40 meets the primary tangent of the arcuate portions 22 of members 10 and with dimensions so far recited extends approximately 1.2 m (4') above the shelter. The inner head of member 40—that is to say below the plates 14, 14'—is domed.

Figure 6:
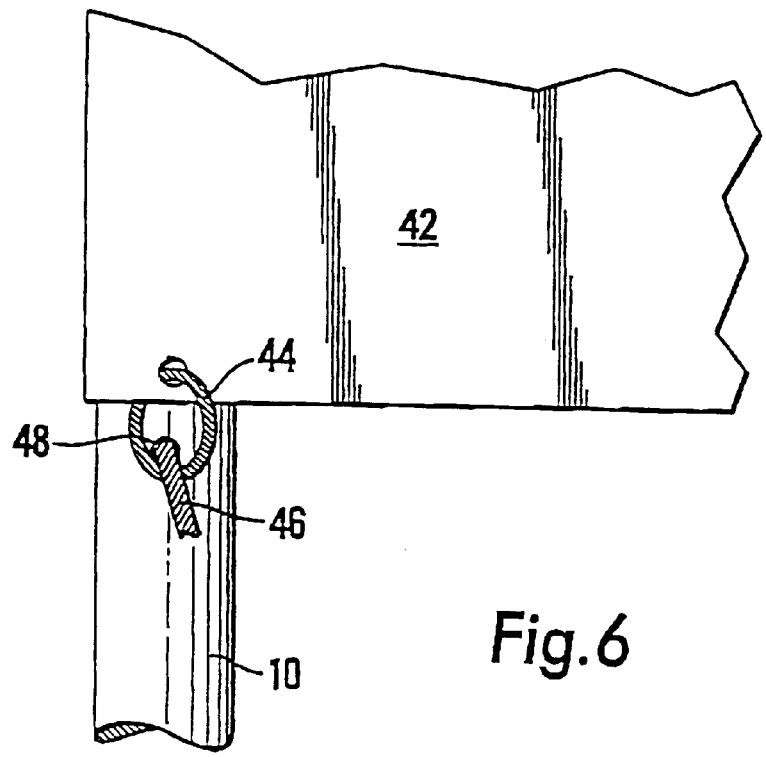

The shelter may further be provided with a waterproof textile fabric (e.g. canvas) cover 42. This is positioned on the shelter by first removing the member 40 and then throwing the cover above and across the top of the frame formed by the members 10. The edges of the cover 42 (see detail FIG. 6) are provided with pairs of loops 44 of rope or cord which are positioned to lie to either side of the members 10.

Cove 42 is held in position by passing a further rope or cord 46 through the loops 44 and apertures 48 formed in the members 10. Once the rope 46 has been passed through each of the loops 44 and apertures 48 it may be tied off to firmly hold the cover 42 in position.

Figure 6A:
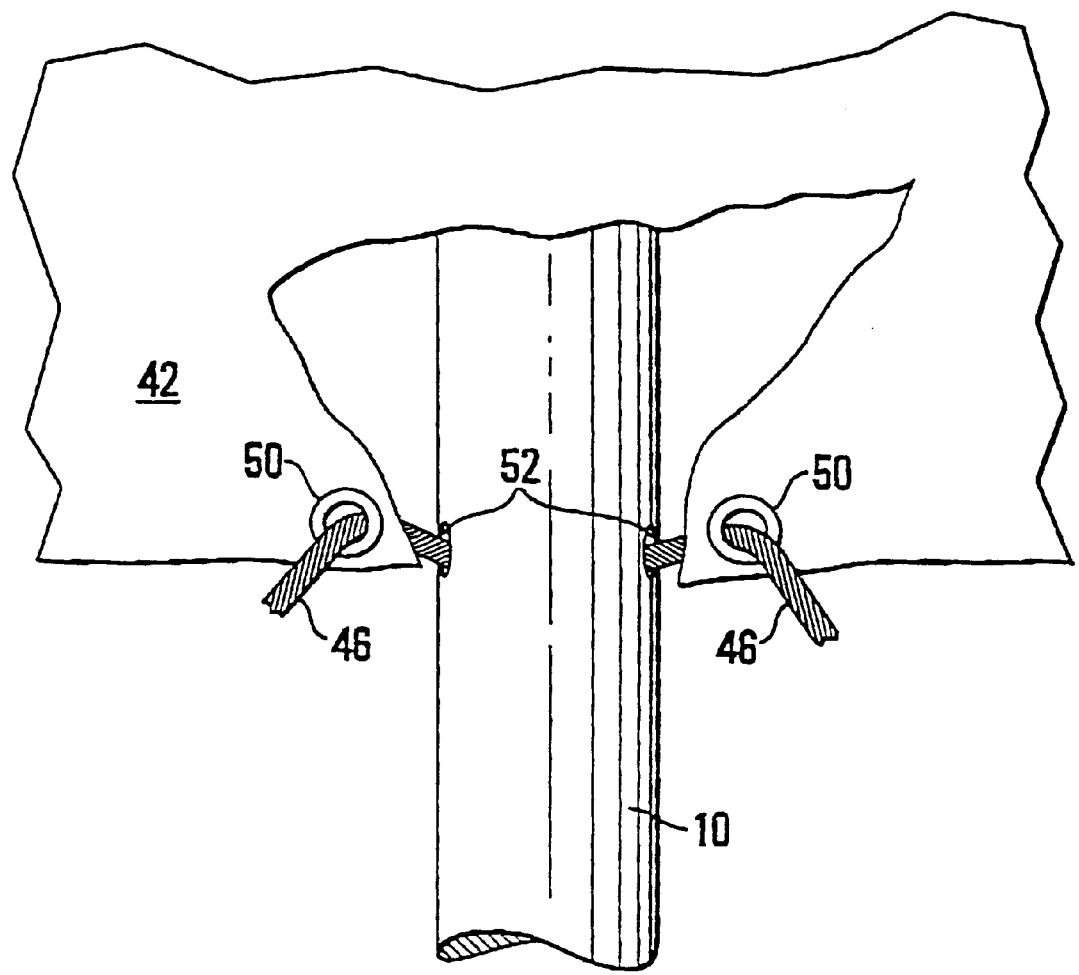

An alternative way of fixing the cover 42 in position would be (see FIG. 6A) to provide a series of eyelets 50 in the edge of the cover 42 and apertures 52 in the members 10 through which the rope 46 is passed and then tied off.

At that time member 40 may be again passed through the aperture 39 in the plates 14, 14' and held in position by nut 41, the center of the cover 42 being formed with an aperture allowing the member 40 to be so positioned.

It will be appreciated that once the shelter has been erected and positioned it will provide effective protection for anyone in the shelter from lightning strikes. Any lightning strike would be attracted to the centrally located spike member 40 and carried therefrom via members 10 to the earthing or grounding spikes 28, 34.

The welded metal mesh floor 36 adds further protection for anyone in the shelter in the event of a lightning strike. The floor may be located beneath the ground on which the shelter stands.

Figure 1:
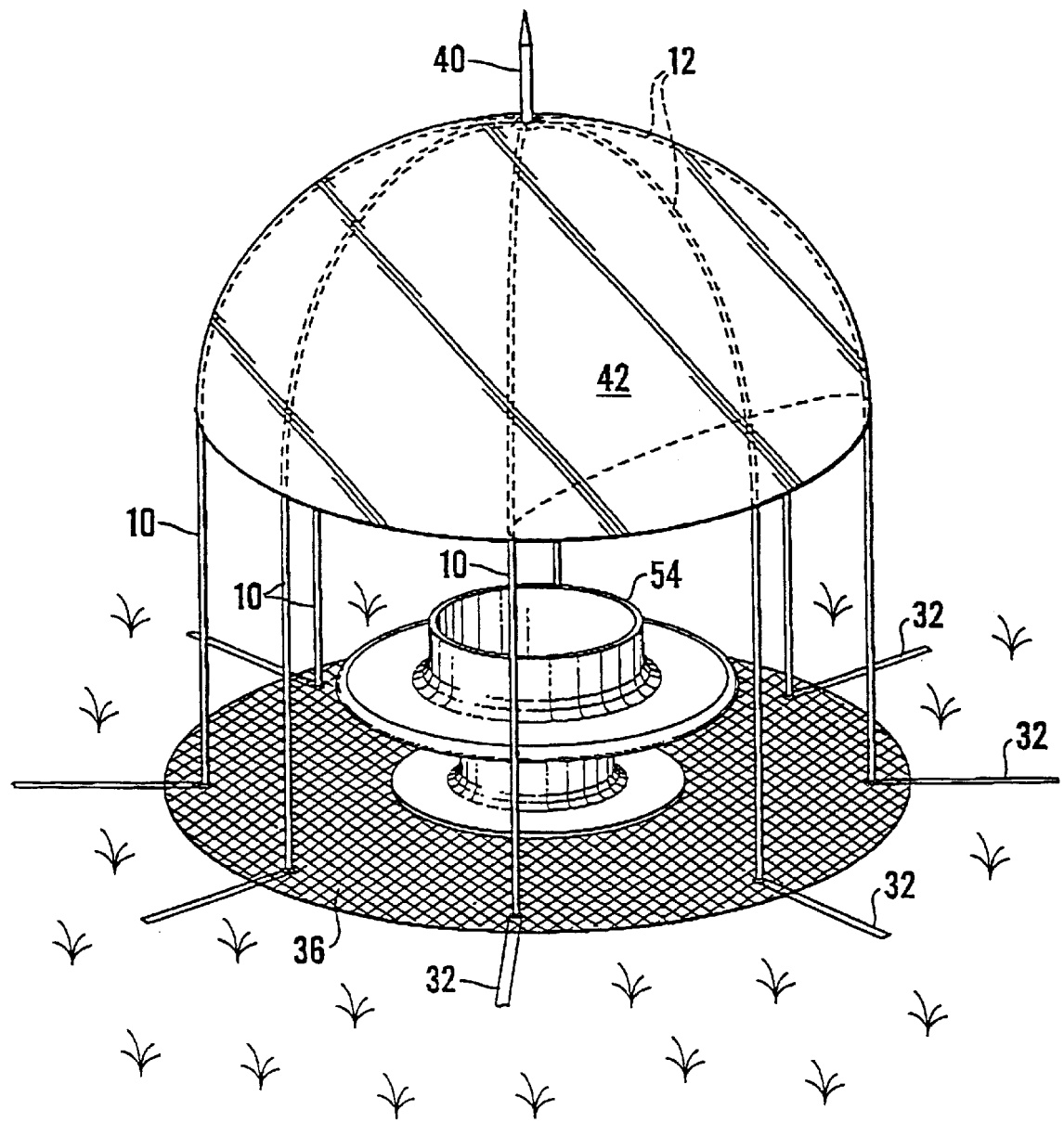
FIG. 1 is a perspective view of a shelter embodying the invention.

The shelter may include a seat or bench as shown at 54 in FIG. 1.

The plates 14, 14'; the members 10; the earthing or grounding spikes 28 and 34; and the grounding bars 32 may be of any suitable metal such as, for example, aluminium.

For maximum safety all metal objects should remain outside the circle defined by the grounding spikes 34.

The length of the grounding spikes 28, 34 will depend upon the conditions of the soil on which the shelter is to be mounted.

It will be appreciated that many modifications may be made to the disclosed arrangement without departing from the scope of the present invention. For example the number of members 10 and their relative sizes may be varied from that shown and waterproof materials other than canvas may be used to form the cover 42.

What is claimed is:

1. A shelter comprising a plurality of elongate electrically conductive members each having a first end and a second end, said first ends of said elongate electrically conductive members being held conjoined at a point by fixing means, wherein each elongate electrically conductive member extends away from and depends from its first end to define a frame and wherein the second end of each elongate electrically conductive member is provided with a first electrically conductive spike member drivable into the ground upon which the shelter stands and wherein the shelter is provided with a floor of electrically conductive material.

2. A shelter as claimed in claim 1, including a further electrically conductive member removably mountable on said fixing means at the where said plurality of elongate electrically conductive members are held conjoined to extend normally away from said frame.

3. A shelter as claimed in claim 1, wherein each said elongate electrically conductive member in moving from said first to said second end thereof extends firstly through a curved portion and then through a generally straight portion.

4. A shelter as claimed in claim 3, wherein said curved portion is substantially one quarter of a circle.

5. A shelter as claimed in any one of claims 1 to 4, wherein said second ends of the plurality of electrically conductive elongate members define points on the perimeter of a circle.

6. A shelter as claimed in claim 5, wherein each of said plurality of elongate electrically conductive members has attached thereto adjacent said second end thereof and electrically connected therewith another electrically conductive member extending generally radially outwardly of the circle.

7. A shelter as claimed in claim 6, wherein each of said other outwardly extending conductive members has at the free end thereof a further electrically conductive spike member drivable into the ground.

8. A shelter as claimed in claim 1, wherein said floor is of welded metal mesh.

9. A shelter as claimed in claim 8, wherein said floor is electrically coupled to each of said plurality of elongate electrically conductive members and said first spike members.

10. A shelter as claimed in claim 8, wherein said floor extends outwardly of the second ends of the plurality of electrically conductive elongate members.

11. A shelter as claimed in claim 8, wherein said floor is welded to collars adapted to surround the elongate electrically conductive members and to be fixed thereto by a plurality of electrically conductive bolts.

12. A shelter as claimed in claim 7, wherein the outer perimeter of said floor is within the perimeter of the circle defined by said further spike members.

13. A shelter as claimed in claim 7, wherein the outer perimeter of said floor is within the perimeter of the circle defined by said further spike members.

14. A shelter as claimed in claim 7, wherein the floor and the further spike members are, in use, located beneath the surface of ground upon which the shelter stands.

15. A shelter as claimed in claim 1, wherein said fixing means holding said first ends of the plurality of elongate electrically conductive members comprises a pair of plate members bolted to either side of said first ends.

16. A shelter as claimed in claim 1, further comprising a cover of a waterproof fabric material placeable over at least part of said frame.

17. A shelter as claimed in claim 16, wherein said cover is held in position when placed on the frame by a rope passing through loops carried on the edges of the cover and through apertures in said elongate electrically conductive members.

18. A shelter as claimed in claim 17, wherein said cover is held on in position when placed on the frame by a rope passing through apertures formed in the elongate electrically conductive members and eyelets formed in the edge of the cover.

\* \* \* \* \*